United States Patent [19]

Fukuda et al.

[11] Patent Number: 5,430,708
[45] Date of Patent: Jul. 4, 1995

[54] CONTROL CHANNEL TERMINATING INTERFACE AND ITS TESTING DEVICE FOR SENDING AND RECEIVING SIGNAL

[75] Inventors: Keiji Fukuda, Kawasaki; Kazuhiko Ito, Yokohama, both of Japan

[73] Assignee: Fujiisu Limited, Kawasaki, Japan

[21] Appl. No.: 135,429

[22] Filed: Oct. 12, 1993

Related U.S. Application Data

[63] Continuation of Ser. No. 936,326, Aug. 28, 1992, abandoned, which is a continuation of Ser. No. 584,708, Sep. 19, 1990, abandoned.

[30] Foreign Application Priority Data

Sep. 19, 1989 [JP] Japan ................................ 1-240595
Dec. 6, 1989 [JP] Japan ................................ 1-316990

[51] Int. Cl.[6] ......................... H04J 3/12; H04L 12/26
[52] U.S. Cl. ..................................... 370/13; 370/58.2; 370/68.1; 370/110.1
[58] Field of Search ........................... 370/13, 14, 15, 17, 370/55, 58.1, 58.2, 68.1, 110.1, 111, 112; 371/24, 27, 15.1; 379/93, 94

[56] References Cited

U.S. PATENT DOCUMENTS

| | | | |
|---|---|---|---|
| 3,796,835 | 3/1974 | Closs et al. | 370/60 |
| 3,823,269 | 7/1974 | Saito . | |
| 4,377,859 | 3/1983 | Dunning et al. | 370/58.2 |
| 4,485,468 | 11/1984 | Slana | 370/58.2 |
| 4,520,477 | 5/1985 | Wen | 370/111 |
| 4,754,456 | 6/1988 | Yato et al. | 370/112 |
| 4,761,779 | 8/1988 | Nara et al. | 370/58.2 |
| 4,821,264 | 4/1989 | Kim | 370/110.1 |
| 4,860,281 | 8/1989 | Finley et al. | 370/15 |
| 4,912,703 | 3/1990 | Sumida | 370/58.2 |
| 4,961,187 | 10/1990 | Gupta | 370/58.2 |
| 4,985,887 | 1/1991 | Mizuhara et al. | 370/58.2 |
| 4,985,891 | 1/1991 | Fujiwara et al. | 370/110.1 |
| 4,989,202 | 1/1991 | Soto et al. | 370/110.1 |
| 5,051,992 | 9/1991 | Taniguchi et al. | 370/110.1 |

FOREIGN PATENT DOCUMENTS

| | | |
|---|---|---|
| 0049568 | 4/1982 | European Pat. Off. . |
| 171808A3 | 8/1984 | European Pat. Off. . |
| 0251587 | 1/1988 | European Pat. Off. . |
| 59-198061A | 3/1985 | Japan . |
| 2158326 | 4/1984 | United Kingdom . |

OTHER PUBLICATIONS

IEEE International Conference on Communications '87, Session 11, paper 6, 8 Jun. 1987, Seattle US pp. 1–5; R. Mohri et al., p. 4; FIG. 3, "Circuit and Packet Switching System Architecture For An ISDN."
The Post Office Electrical Eng. J. vol. 72, No. 2, Jul. 1979, London GB pp. 108–116; E. J. Welsh et al.; FIGS. 1,2, "A New Digital 1VF Signalling Unit."
Proceedings of the National Communications Forum, vol. 40, No. I, 1986, Oak Brook, Ill. US pp. 529–533; H. Ishiwaka, p. 531, left column, line 17–line 40; FIGS. 5,7, "Technologies For Realizing ISDN Commercial Service in Japan."
Japan Telecommunication Review, vol. 30, No. 3, Jul. 1988, Tokyo JP pp. 42–50; M. Tokunaga; p. 45, left column, line 7–line 13; FIG. 3, "Advanced Multimedia time-Division Multiplexer."

*Primary Examiner*—Melvin Marcelo
*Attorney, Agent, or Firm*—Staas & Halsey

[57] ABSTRACT

A system includes private lines for carrying respective signals which each have at least one D channel for control information, and plural B channels for data. The system also includes a multiplexer connected to the private lines, which receives the signals and generates a multiplexed signal for transmission on a digital multiplex interface. The system further includes a demultiplexer which receives the multiplexed signal received from the digital multiplex interface, to generate signals for transmission on the private lines. The multiplexer and demultiplexer are designed so that the total number of D channels and B channels can be changed without requiring significant effort or modification of either the multiplexer or the demultiplexer. The system also includes a testing device which transmits and returns a multiplexed signal from the multiplexer, to the demultiplexer. The returned multiplexed signal can be used to test the system without requiring involvement of external devices.

11 Claims, 15 Drawing Sheets

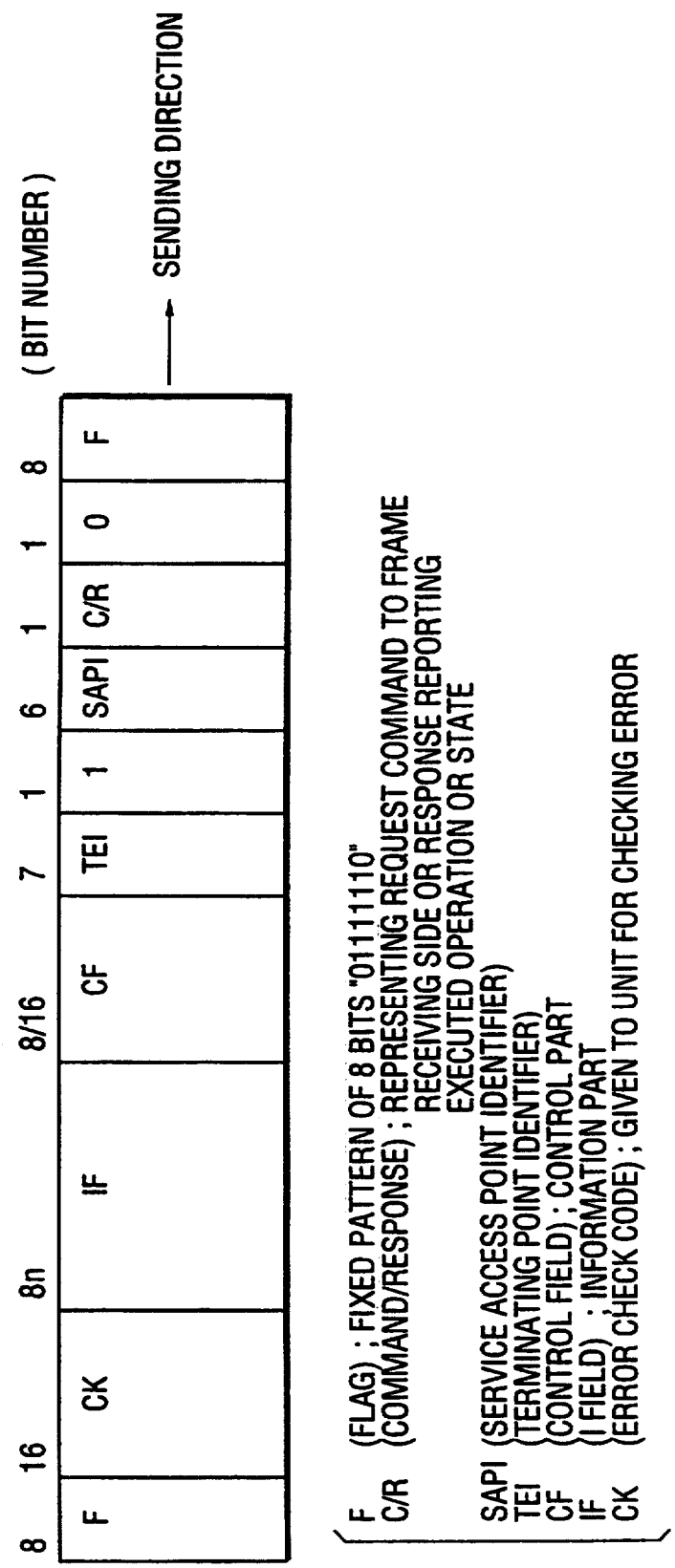

CONTROL CHANNEL TERMINATING INTERFACE AND ITS TESTING DEVICE FOR SENDING AND RECEIVING SIGNAL

This application is a continuation of application Ser. No. 07/936,326, filed Aug. 28, 1992, now abandoned, which is a continuation of application Ser. No. 07/548,708, filed Sep. 19, 1990, abandoned.

BACKGROUND OF THE INVENTION

1. Field of the Invention

This invention relates to a terminating interface of a control channel with a large degree of freedom at a digital multiplexing interface. It also relates to a testing device for performing tests of sending and receiving signals.

2. Description of the Related Art

Conventionally, an interface with a transmission speed of 1.544 Mbits/sec on which 24 digital channels are multiplexed and an interface with a transmission speed 2.048 Mbits/sec on which 32 digital channels are multiplexed have been adopted as a digital multiplex interface.

At such an interface, an individual line signal method of sending and receiving control signals using an individual communication line has been adopted as a method of sending and receiving control signals among stations, such as one containing call control information.

However, as various services are offered when an ISDN (Integrated Services Digital Network) is being put into service, both the quantity and variety of interstation control signals are increased, and a signal method with a higher speed and a larger capacity is demanded. Therefore, existing individual line signal methods are inadequate for a sending and receiving interstation control signals.

Thus, recently, a common line signal method of sending and receiving a control signal with a common data line has been adopted. A No. 7 common line signal method and a D-channel common line signal method are representative common line signal methods for ISDN. The former is a signal method fit originally for a voice communication, and the latter is a method fit for a data communication. Because these two methods differ only in their data formats and are similar in their basic transmission methods, the following explanation is made for the No. 7 common line signal method.

FIG. 1 shows the configuration of a commonly used digital signal network. Each PBX (Private Branch Exchange) 101 that accommodates a user terminal is connected to the public network P via a transmission device 102 from a digital multiplex interface 103. Examples of digital multiplex interface 103 include one called "30B+D", whose transmission speed is 2.048 Mbits/sec and comprises 30 B channels and a D channel (hereafter called 2M multiplex interface), and a digital multiplex interface called "23B+D" whose transmission speed is 1.544 Mbits/sec and comprises, 23 B channels and a D channel (hereafter called 1.5M multiplex interface).

FIGS. 2A and 2B respectively show the data formats of the above described 2M multiplexing interface and the 1.5M multiplexing interface. In the 2M multiplexing interface shown in FIG. 2A, channel C for a frame control is assigned to channel number (time slot) 00 on a transmission route, and channel D for transmitting a control signal is assigned to channel number 16. 30 channels of line channel B for user information transmission are assigned to other channels, namely, channels 01 through 15 and channels 17 through 31. In the 1.5M multiplexing interface shown in FIG. 2B, bit F for a frame synchronization is assigned to the forefront bit on the transmission line, and channel D for transmitting a control signal is assigned to channel number 23. 23 channels of line channel B for user information transmission are assigned to other channels, i.e. channels 01 through 22.

Here, as shown in FIG. 1, when a network is configured by using a public network p like an ISDN exclusively for a digital signal, an efficient control signal transmission is made available by using D channel, whose position is predetermined on a fixed basis.

However, when a control signal is sent and received by configuring a digital multiplexing interface using an existing network (for instance for a certain intracorporate communications), the method of using the D channel whose position is fixed, as in FIGS. 2A and 2B, has disadvantages. For example, when a total of five existing digital multiplexing transmission routes comprising three transmission routes of 5B+D (five B channels and a D channel; similarly abbreviated below), a transmission route of 4B+D, and a transmission route of 7B+D, is terminated and connected to a PBX with a 2M multiplex, the B channel has only to terminate 26 channels. Meanwhile, in this case, the D channel has to terminate 5 channels. Yet, the 2M multiplexing interface defined so far has a fixed form of 30B+D as shown in FIG. 2A and cannot meet the demand described above "as is".

As discussed above, in an intra-corporate network that does not need a public network, an existing digital multiplexing transmission route is often terminated. Accordingly, a channel that handles a control signal must be flexibly assigned to the terminated digital multiplexing interface. However, an existing digital multiplexing interface where the number and position of the D channel are fixed has a problem of being incapable of efficient termination of the control channel in the intracorporate network discussed above.

On the other hand, it is crucial for stable operation of the network to test the sending and receiving of a signal at each terminating device at the beginning or during the course of the network operation. Needless to say, such a test of sending and receiving a signal is necessary for an intracorporate network having a digital multiplexing interface, as discussed above.

FIG. 3 shows a commonly used method of testing sending and receiving signals. When a PBX 301, which is a terminating equipment of the home station A, is connected to a digital multiplexing transmission route (digital transmission line) via a transmitter 302, the following test of sending and receiving signals are usually made. The sending and receiving voice is tested by having a telephone device 303, terminated in the home station A, call up another telephone device 303 terminated in the counter station B. The sending and receiving data is tested by having a data terminal 304, terminated in the home station A, call up another data terminal 304 terminated in the counter station B.

However, this testing method has a problem of always requiring a counter station B or a device that realizes the same function as the counter station. Besides, the above testing method has the problem of having to simultaneously work on the home station A and the counter station B, even if the counter station B can indeed be prepared. Furthermore, in the above testing method, the digital multiplex transmission route, which is an actual line for connecting the home station A and the counter station B, must be in a usable condition. But in reality, there is a problem that the digital multiplex transmission route is usable at the time of testing.

SUMMARY OF THE INVENTION

This invention was made based on the background described above. An object of the invention is to assign each control channel to a digital multiplexing interface by terminating it flexibly and efficiently, even if the number of channels of the control signals to be B terminated is changed when existing various transmission routes are terminated.

According to the present invention, a plurality of a control channel signals generated in the control channel signal generation part is multiplexed at a control channel signal multiplexation part to any plural time slots on the digital multiplex transmission route, whereas on the contrary the control channel signal separated from these time slots at a control channel separation part is inputted to a control signal extraction part, where plural kinds of control signals are extracted. Thus, even if the number of channels of the control signals to be terminated changes, each control channel signal is flexibly and efficiently terminated.

Furthermore, in a device that tests sending and receiving a signal of a control channel signal terminating interface, a plurality of a control channel signal set to either a terminal side mode or a network side mode at a control channel signal terminating part is outputted from a control channel signal multiplexation part, turned around at a turnaround part, inputted to a control channel signal separation part, and separated again. A plurality of each control channel signal thus separated exchanges the respective time slots between the control channel signal set to the first mode and the control channel signal set to the second mode at an exchanging part. This configuration enables a testing of sending and receiving the control channel terminating device by receiving the control channel signal sent from one control channel terminating interface at the same control channel terminating interface.

Another object of the invention is to test sending and receiving a signal alone at a home station, regardless of the condition of a counter station or a digital transmission line, by using a plurality of a control signal channels.

A first embodiment of this invention, wherein a control channel terminating interface that terminates the control channel signal in the digital multiplexing transmission route that configures ISDN and the like, has the following configuration.

First, a control channel signal generation part is provided for generating a control channel signal such as a No. 7 common line signal or a plurality of D channel signals from plural kinds of control signals.

Second, it comprises a control channel signal multiplexing part for assigning any of a plurality of time slots among time slots on a digital multiplexing transmission route to a control signal sending channel and for muliplexing a plurality of control channel signals to each time slot.

Third, a control channel signal separation part is provided for assigning any of a plurality of time slots among time slots on a digital multiplexing transmission route to a control signal receiving channel and for separating a plurality of control channel signals transmitted over the digital multiplexing transmission route after being multiplexed by each corresponding time slot.

Fourth, a control signal extraction part is provided for extracting corresponding plural kinds of control signals from each control channel signal separated in the separation part.

The first embodiment of this invention described above realizes that each control channel signal is flexibly and efficiently terminated and assigned to each time slot on the digital multiplexing transmission route, even if the channel number of a control signal to be terminated changes, when a digital multiplexing transmission route is formed after a plurality of existing digital multiplexing transmission routes is terminated, for instance in a certain intracorporate communication network. Thus, it becomes possible to offer services such as the D channel common line signal method and the No. 7 common line signal method without creating a new network. In this case, since it becomes possible to assign each control channel to a digital multiplexing transmission route, when any route is separated, no unnecessary channel is assigned to each channel, and the line is effectively used.

A second embodiment of this invention, wherein a sending and receiving signal testing device that tests sending and receiving of a signal of the control channel terminating device configured as in the first embodiment of this invention described above, has the following configuration.

First, a control channel signal termination part is provided for setting the mode of a plurality of the control channel signals multiplexed in the control signal multiplexing part to either a first mode or a second mode. The first mode and the second mode may be, for example, a terminal side mode and a network side mode.

Second, a turnaround part is provided for turning around the output from the control channel signal multiplexing part and inputting it to the control channel signal separation part described earlier.

Third, an exchanging part is provided for exchanging respective time slots between the control channel signal set in the first mode and the control channel signal set in the second mode, in a plurality of control channel signals separated from the control channel signal separation part.

The second embodiment of this invention described above realizes that sending and receiving a signal of a control channel terminating interface is tested by having a control channel signal sent from a control channel terminating apparatus and received at the same control channel terminating interface.

According to the second embodiment of this invention, since the control channel signal sent and set e.g. at the network side mode is sending and receivingd to the terminal side mode time slot, it is received at the processing part that receives the control channel signal for the terminal side mode within the control channel signal terminating part. In contrast, since the control channel signal sent and set at the terminal side mode is sending and receivingd to the network side mode time slot, it is received at the processing part that receives the control channel signal for the network side mode within the control channel signal terminating part. These processing parts are a part of the function of an ordinary call-up processing in an ISDN or the like. These actions realize a condition in a mock where a signal is actually received at a terminal from a network and a signal is actually sent to the network from the terminal. Therefore, it becomes possible to test sending and receiving a signal alone in the home station without actually connecting the digital multiplexing transmission route and the counter station device to the control channel terminating device.

BRIEF DESCRIPTION OF THE DRAWINGS

A person of ordinary skill in the art should easily understand other objects or features of this invention from the attached drawings and preferred embodiments of this invention. In the drawings:

FIG. 11A is a configuration diagram of a HDLC (High Level Data Link Control Procedure) format, FIG. 11B is a configuration diagram of a D channel format.

DESCRIPTION OF THE PREFERRED EMBODIMENTS

Explanation of the First Principle of this Invention

Figure 4:
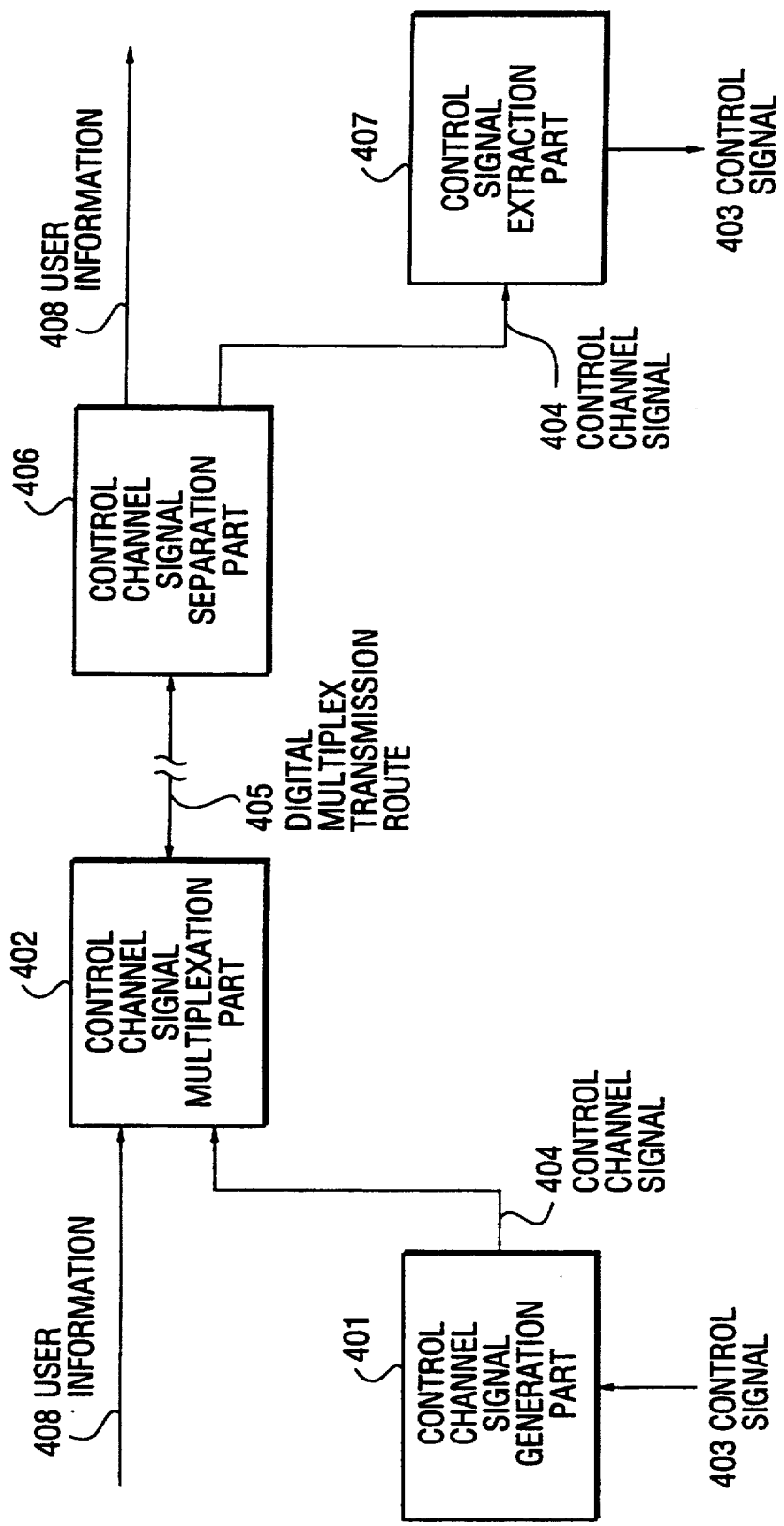
FIG. 4 is a block diagram of a first principle of this invention.

FIG. 4 is a block diagram of a first principle of this invention.

The first principle of this invention applies to both the sending side and the receiving side of the PBX and the like that terminates a digital multiplex transmission route.

First, the configuration on the sending side is explained.

To begin with, a control channel signal generation part 401 generates a plurality of a control channel signals 404 from plural kinds of a control signals 403. It also generates a frame signal based on a high level data link sequence as a control channel signal 404 e.g. from plural kinds of a control signal 403 such as a call-up control signal.

Next, a control channel signal multiplexation part 402 assigns any of plural time slots among the time slots on a digital multiplex transmission route 405 to a control signal sending channel, and multiplex in its time slot each control channel signal 404 generated in the above described control channel signal generation part 401. It also comprises a memory for temporarily storing the frame signal which is the control channel signal 404 outputted e.g. from the control channel signal generation part 401, a timing generation circuit for generating a timing signal that becomes active in the predetermined plural empty time slots to which user information 408 on the digital multiplex transmission route 405 is not assigned, and a selector for reading out the frame signal which is the control channel signal 404 temporarily store in the memory at each timing when the timing signal is activated and multiplexing it to each time slot described above.

Second, the configuration on the sending side is explained.

A control channel signal separation part 406 assigns any of a plural time slots among the time slots on a digital multiplex transmission route 405 to a control signal sending channel, and separates the control channel signal 404 transmitted on the transmission route 405 from the time slot described earlier.

A control signal extraction part 407 extracts the corresponding plural kinds of the control signal 403 from each control channel signal 404 separated in the control channel signal separation part 406 described earlier. It is configured reverse e.g. from the control channel signal generation part 401 described earlier.

In the first principle configuration of this invention, e.g. in a certain intracorporate communication network and the like, a case is considered in which a plurality of an existing digital multiplex transmission route is terminated and the digital multiplex transmission route 405 shown in FIG. 4 is formed. In this case, after being converted to a control channel signal 404 in the control channel signal generation part 401, the control signal 403 used for a communication control is multiplexed to plural time slots preassigned in the digital multiplex transmission route 405 by the control channel signal multiplexation part 402. In the control channel signal separation part 406 and the control signal extraction part 407, actions entirely reverse to the above are performed.

Consequently, when the existing various transmission routes are terminated, even if the channel number of the control signal to be terminated changes, it becomes possible to flexibly and efficiently terminate each control channel signal 404 and assign it to each time slot on the digital multiplex transmission route 405.

Explanation of the Second Principle of this Invention

Figure 5:
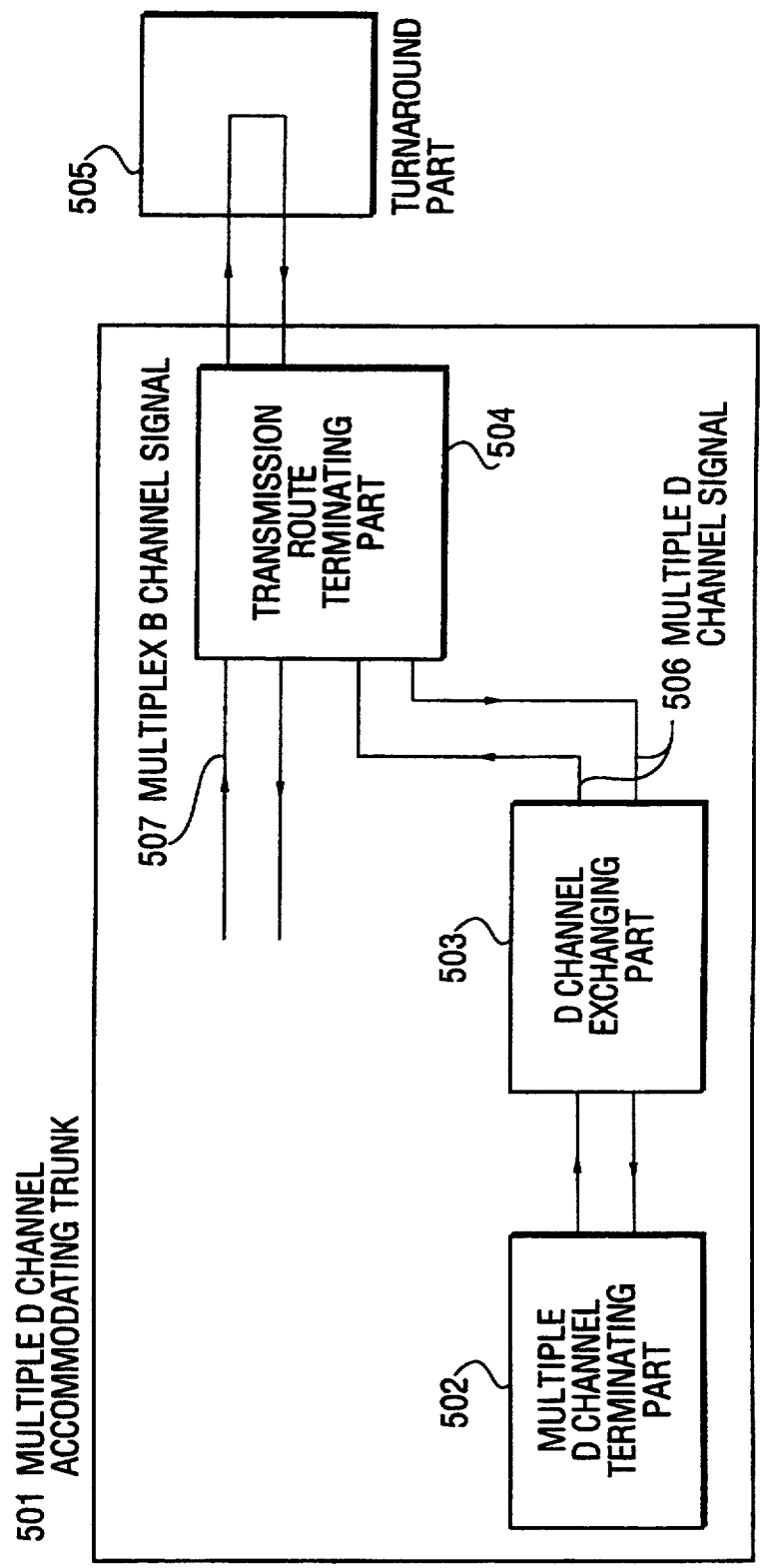
FIG. 5 is a block diagram of a second principle of this invention.

FIG. 5 is a block diagram of a second principle of this invention.

The second principle of this invention applies to either the trunk or the terminating device that terminates a digital multiplex transmission route that multiplexes plural control channels like the terminating device applied with the above first principle of this invention, and relates to the technology of its testing of sending and receiving a signal. Although in the following explanation, the control channel signal is represented by that of the D channel signal, and other user information channel signal is represented by a B channel signal, it is of course possible to substitute e.g. the D channel signal with a signal according to other signal method such as a No. 7 common line signal.

In FIG. 5, a multiple D channel accommodating trunk 501 is a various transmission line trunk device like a PBX, comprising a multiple D channel terminating part 502, a D channel exchanging part 503 and a transmission route terminating part 504 within the trunk.

The multiple D channel terminating part 502 sends a plurality of a D channel signal 506 and sets either of the following two modes to each of it. The two modes are the network side mode that follows the signal sequence and the signal content on the network (public network) side, and the terminal side mode that follows the signal sequence and the signal content on the terminal side. The above mode setting is done, for instance, by setting a flag for identifying the mode in a part of the signal content.

The D channel exchanging part 503 exchanges the multiplexed time slot of a plurality of the D channel signal 506.

The transmission route terminating part 504 performs an interface with the digital multiplex transmission route that can be connected with the outside of the multiple D channel accommodating trunk 501, assigns each time slot on the above transmission route to a plurality of the B channel signal 507 and the D channel signal 506, multiplex each signal at each of those time slots, and separates each signal multiplexed at each time slot.

A turnaround part 505 is connected with the exit or the outside of the multiple D channel accommodating trunk 501, and turns around the output (sending) signal from the transmission terminating part 504 "as is" and makes it the input (receiving) signal to the transmission terminating part 504. That is, the turnaround part 505 is a part that connects an input terminal and an output terminal of the transmission terminating part 504 and is a substitute for a counter station in a test of sending and receiving a signal.

A case is considered in which sending and receiving a signal is tested based on the above second principle of this invention. The multiple D channel terminating part 502 sets the network side mode to at least one D channel signal 506 and the terminal side mode to at least one another D channel signal 506, and sends these signals to the transmission route terminating part 504. When these signals are sent, the D channel exchanging part 503 acts so that a time slot conversion is not performed.

The transmission route terminating part 504 multiplexes a plurality of the B channel signal 507 and a plurality of the D channel signal 506, and sends them. In this case, the transmission route terminating part 504 performs a similar interface to sending a signal to the digital multiplex transmission route.

The turnaround part 505 turns around the output from the transmission route terminating part 504 "as is" and inputs it to the particular transmission route terminating part 504. Therefore, each time slot multiplexed with at least two of the D channel signal 506 set to each of the two modes described earlier is also turned around "as is".

A plurality of the D channel signal 506 among the turned around signals is sent to the multiple D channel terminating part 502 via the transmission route terminating part 504. When these signals are received, the D channel exchanging part 503 acts to exchange time slots. Namely, the time slot of the D channel signal 506 set on the network side mode and that of the D channel signal 506 set on the terminal side mode are exchanged with each other.

As a result, the D channel signal that is set to the network side mode and sent is received at a D channel receiving part for the terminal side mode not particularly shown in the drawing within the multiple D channel terminating part 502. The D channel signal 506 that is set to the terminal side mode and sent is received at the D channel receiving part of the network side mode not particularly shown in the drawing within the multiple D channel terminating part 502. These receiving parts are a part of the function of an ordinary call-up processing in the ISDN and the like. These actions realize a condition in a mock where a signal is actually received at a terminal from a network and a signal is actually set to the network from the terminal. Therefore, it becomes possible to test sending and receiving a signal alone in the home station without actually connecting the digital multiplex transmission route (digital transmission line) and the counter station device to the multiple D channel accommodating trunk 501.

Here, an existing digital multiplex interface that can contain only one D channel like "30B+D" and "23B+D" cannot test sending and receiving a signal alone in the home station as described above. The reasons are as follows. That is, that even if the output signal from the home station is turned around and inputted to the particular home station "as is", since there is only one D channel, a time slot cannot be exchanged. Therefore, even if a signal is physically received by the turnaround action, its mode becomes the same as the mode when the signal is sent. Here, the D channel differs in the signal content and the signal sequence between the network (public network) side and the terminal side of the PBX and the like. When the D channel of the terminal side mode is sent from a certain terminating device, the D channel of the network side mode needs to be received. Yet, when there is only one D channel as described above, since the mode is the same, even though the signal can be received, sending and receiving a signal cannot be tested based on a normal call-up processing.

Meanwhile, since this invention can realize a digital multiplex interface containing a plurality of the D channel (control channel) as disclosed in the first principle, the use of these D channels enables testing of sending and receiving a signal alone in the home station. This is the big feature of the second principle of this invention.

Basic configuration of the Preferred Embodiment of this Invention

The basic configuration of the preferred embodiment of this invention is explained below.

Figure 6:
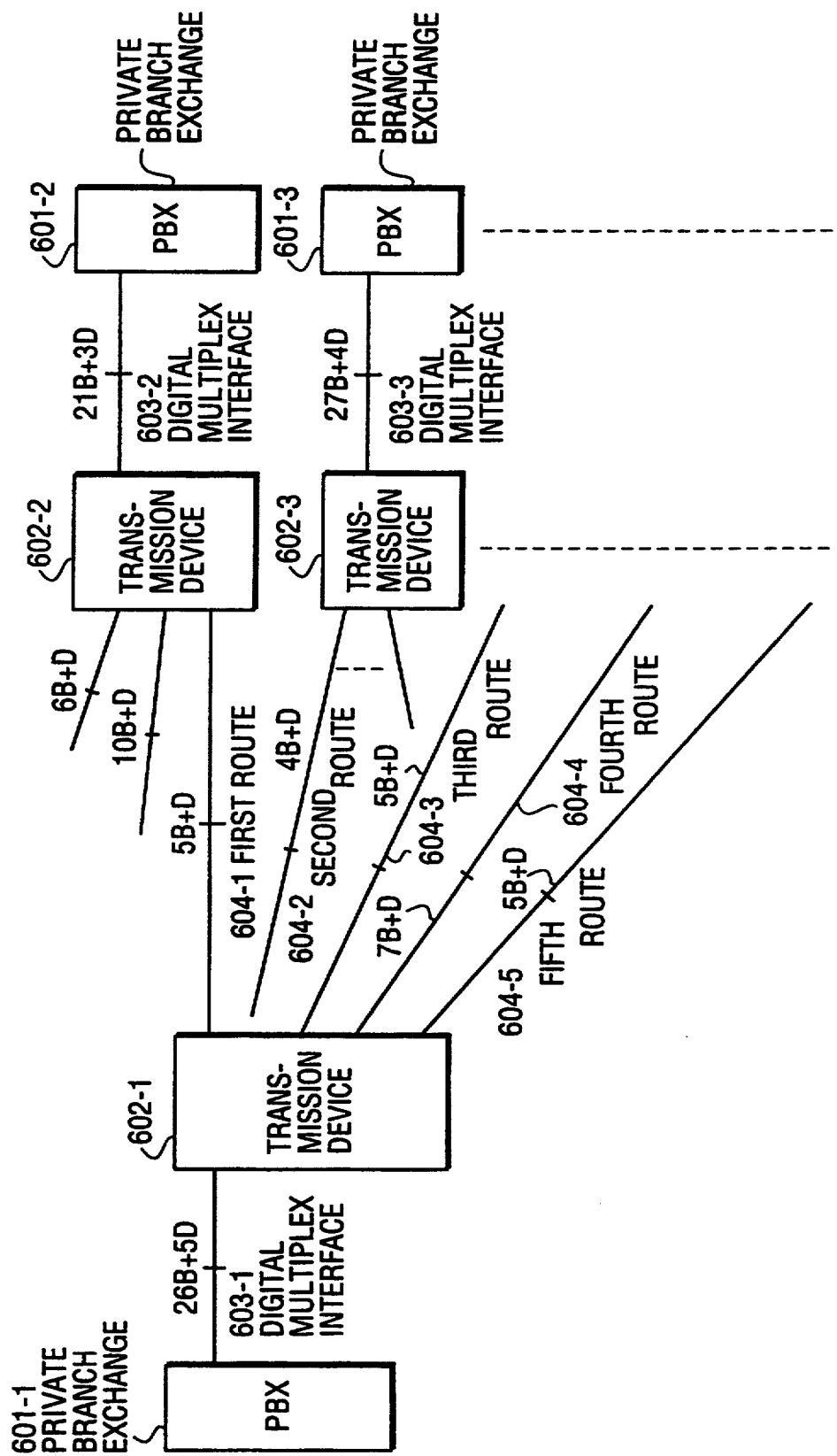
FIG. 6 is a network configuration diagram of an embodiment of this invention.

FIG. 6 is a network configuration diagram of the preferred embodiment of this invention, in which a network based on the ISDN is configured.

The likes of a PBX 601-1 through a PBX 601-3 accommodating each terminal not particularly shown in the drawing are connected with each transmission device 602-1 through 602-3 by digital multiplex interfaces 603-1 through 603-3. Each of the transmission devices 602-1 through 602-3 are connected with each other not through a public network but through a plurality of an existing transmission route whose respective transmission speeds are different. For example, the transmission device 602-1 is connected with another transmission device through a plurality of an existing transmission route comprising a first route 604-1 through a fifth route 604-5. In this case, each route has a channel configuration of 5B+D, 4B+D, 5B+D, 7B+D and 5B+D, respectively.

In the above configuration example, this embodiment can realize a channel configuration of 26B+5D as the digital multiplex interface 603-1 between the PBX 601-1 and the transmission device 602-1. It can also realize a channel configuration of 21B+3D as the digital multiplex interface 603-2 between the PBX 601-2 and the transmission device 602-2, and a channel configuration of 27B+4D as the digital multiplex interface 603-3 between the PBX 601-3 and the transmission device 602-3. Like these, it becomes possible to flexibly assign any channel configuration comprising a combination of the B channel and the D channel to each digital multiplex interface 603-1 through 603-3, depending on the terminating condition of each transmitting device 602-1 through 602-3.

Figure 7:
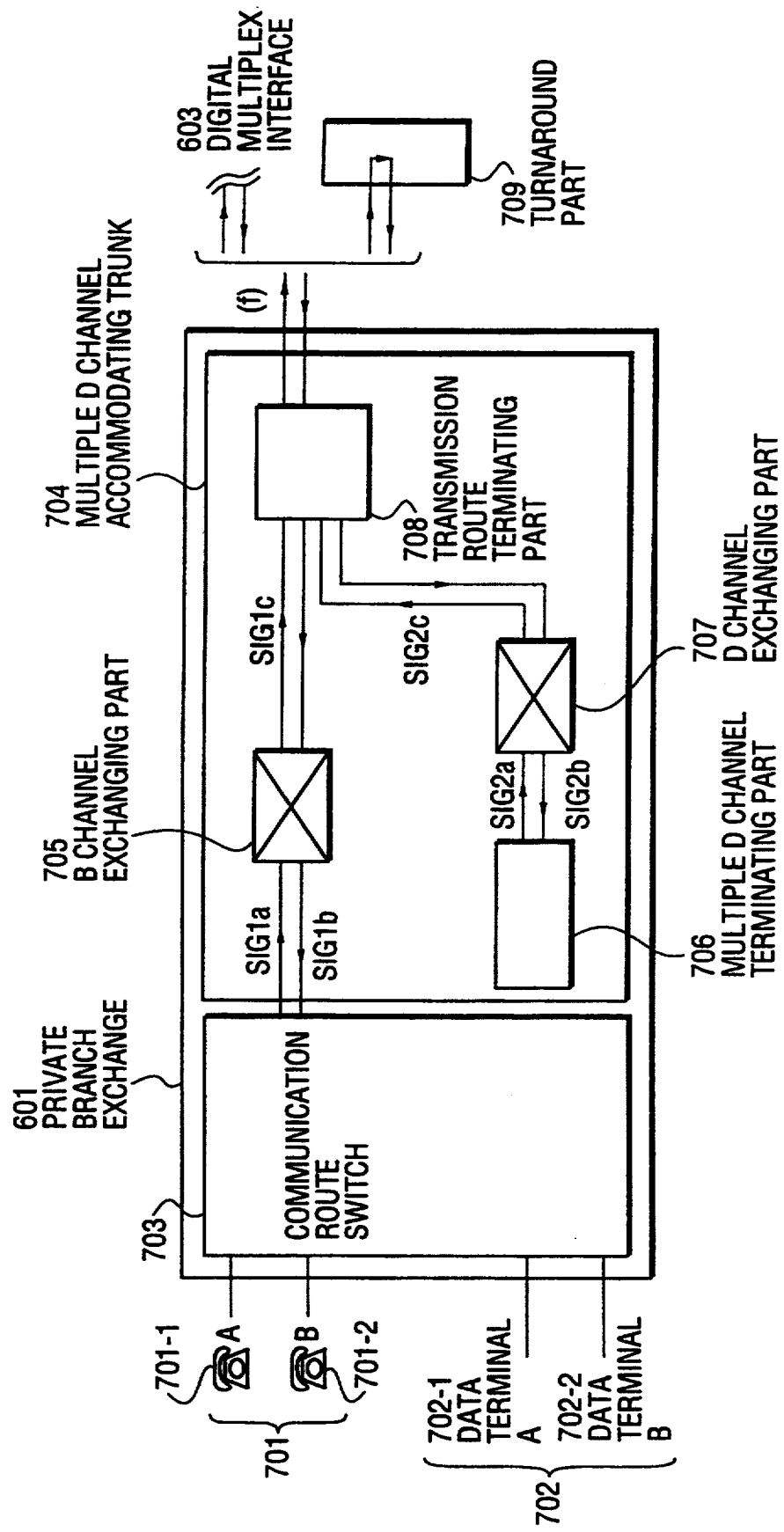
FIG. 7 is a PBX configuration diagram in the embodiment of this invention.

Next, FIG. 7 is a configuration diagram of one of the PBX 601-1 through 601-3 shown in FIG. 6. Since each PBX has a common configuration, it is simply called a PBX 601 in the following explanation.

The PBX 601, as a terminal, accommodates a telephone device 701 (701-1, 701-2, ...) and a data terminal 702 (702-1, 702-2, ...). Voice/data information from the telephone device 701 and the data terminal 702 is sent via a communication route switch 703 to a multiple D channel accommodating trunk 704.

The communication route switch 703 performs an ordinary exchanging actions to the telephone device 701 and the data terminal 702. A transmission route terminating part 708 multiplexes or separates the B channel signal and the D channel signal against the digital multiplex interface.

A multiple D channel terminating part 706 processes the D channel signal.

The transmission route terminating part 708 and the multiple D channel terminating part 706 above described will later be explained in detail.

A B channel exchanging part 705 and a D channel exchanging part 707 are set in connection with the second principle of this invention. They do not work during an ordinary time of sending or receiving a signal but perform an exchanging processing of a time slot respectively corresponding to the B channel and the D channel for the signal turned around outside of the PBX 601 at a testing time of sending and receiving a signal.

When an action corresponding to the first principle of this invention is performed, the transmission route terminating part 708 is connected with the digital multiplex interface 603 (any of 603-1 through 603-3) of FIG. 6. When an action corresponding to the second principle of this invention is performed, the transmission route terminating part 708 is connected with the turnaround part 709. This turnaround part 709 is a unit for turning around the output of the transmission route terminating part 708 physically to its input. Explanation of a time of ordinarily sending and receiving a signal.

In the above basic configuration of FIGS. 6 and 7, a more detailed configuration and a concrete action at the time an ordinary action of sending and receiving a signal are explained below. The below configuration and action relates to the configuration and action of the first principle of this invention described earlier.

Figure 8:
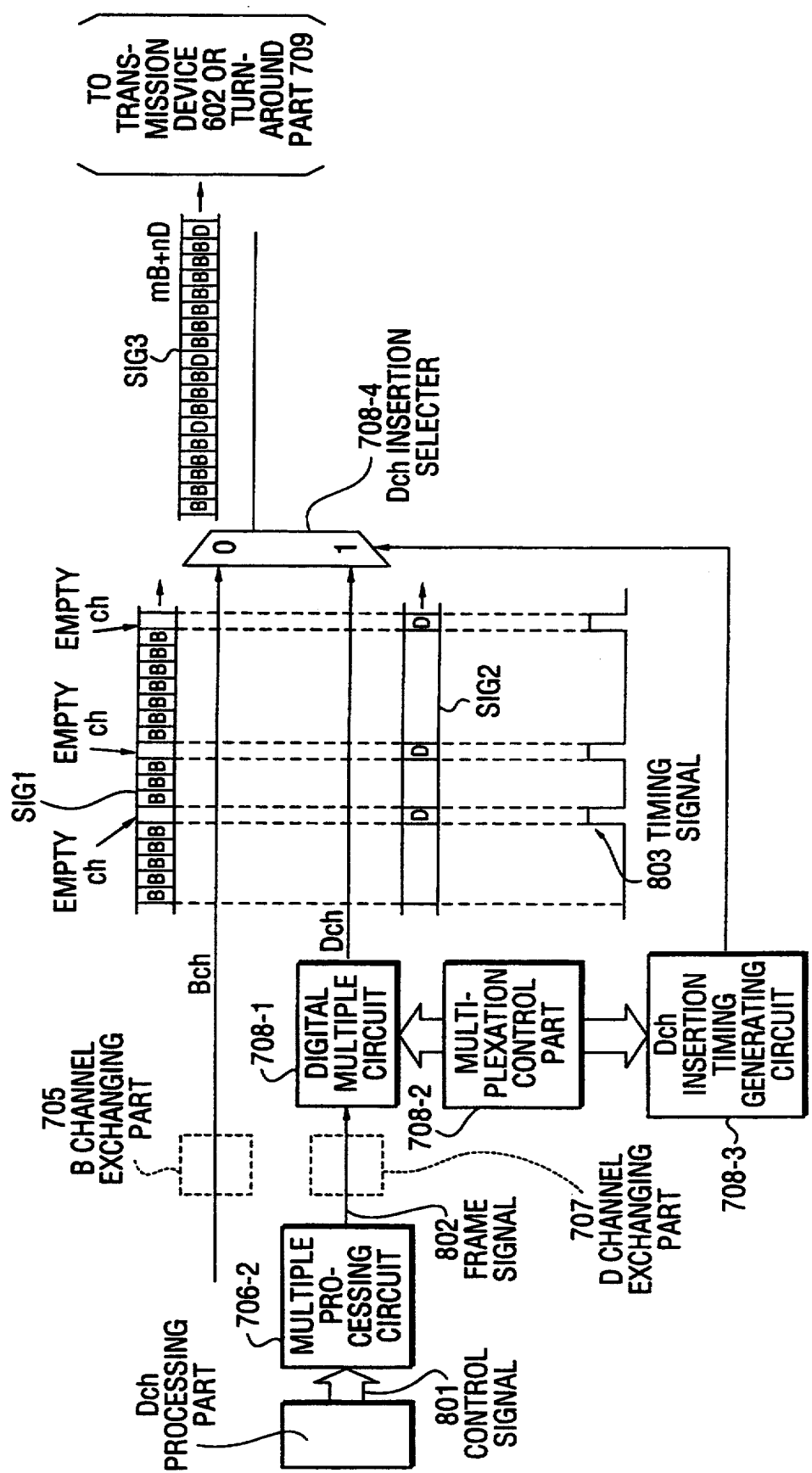
FIG. 8 is a PBX configuration diagram centered around a sending function.

FIG. 8 is a block diagram on the sending side of multiplexing the D channel to the digital multiplex interface 603 (FIG. 7) in the PBX 607. In FIG. 8, a Dch processing part 706-7 and a plurality of a Dch processing circuit 706-2 are configured inside the multiple D channel terminating part 706 of FIG. 7, and a digital multiplex circuit 708-1, a multiplexation control part 708-2, a Dch insertion timing generating circuit 708-3 and a selector for a Dch insertion 708-4 are configured in the transmission route terminating part 708 of FIG. 7.

In the ISDN network of FIG. 6, each user information is inputted as a B channel signal Bch to the PBX 601 from the data terminal 702 or the telephone device 707 of FIG. 7, after being multiplexed to the time slot of the B channel in a format shown in SIG1 of FIG. 8.

At this time, the B channel exchanging part 705 shown as a box of dashed line in FIG. 8 does not exchange a time slot at at sending time, neither at an ordinary sending time nor at a testing time of sending and receiving a signal. This action is later described together with the action at the receiving time during a testing time of sending and receiving a signal.

Meanwhile, a control signal 801 such as a call-up control signal generated in the PBX 601 by the Dch processing part 706-1 is inputted to multiple Dch processing circuit 706-2, where a frame signal 802 of a HDLC (High Level Data Link Control Procedure) format is assembled. Here, the Dch processing part 706-1 is realized as a software processing executed by a central processing device not particularly shown in the drawing.

The frame signal 802 described above is outputted from a digital multiplex line 708-1 after being converted to a D channel signal Dch shown in FIG. 8 as SIG2. At this time, the D channel exchanging part 707 shown as a box of a dashed line in FIG. 8, does not exchange a time slot at a sending time neither at an ordinary sending time nor at a testing time of sending and receiving a signal. This action is later described together with the action at the receiving time during a testing time of sending and receiving a signal.

This signal and the B channel signal Bch shown as SIG1 in FIG. 8 described earlier is multiplexed at the selector for the Dch insertion 708-4, and a multiplexed signal in a mB+nD (m and n are any integers.) format shown as SIG3 in the drawing is outputted from the digital multiplex interface 603 to the transmission device 602 (Refer to FIG. 6.). At a testing time of sending and receiving a signal described later, the multiplexation signal described above is outputted to the turnaround part 709 (FIG. 7).

Here, the selector for Dch insertion 708-4 selects the D channel signal Dch from the digital multiplex circuit 708-1 at the timing when the timing signal 803 outputted from the Dch insertion timing generation circuit 708-3 becomes active, and selects the B channel signal Bch at all other timings.

The actions of the digital multiplex circuit 708-1 and Dch insertion timing generation circuit 708-3 are controlled by the multiplexation control part 708-2. The multiplexation control part 708-2 is realized as a software processing executed by a central processing device not particularly shown in the drawing.

Figure 9:
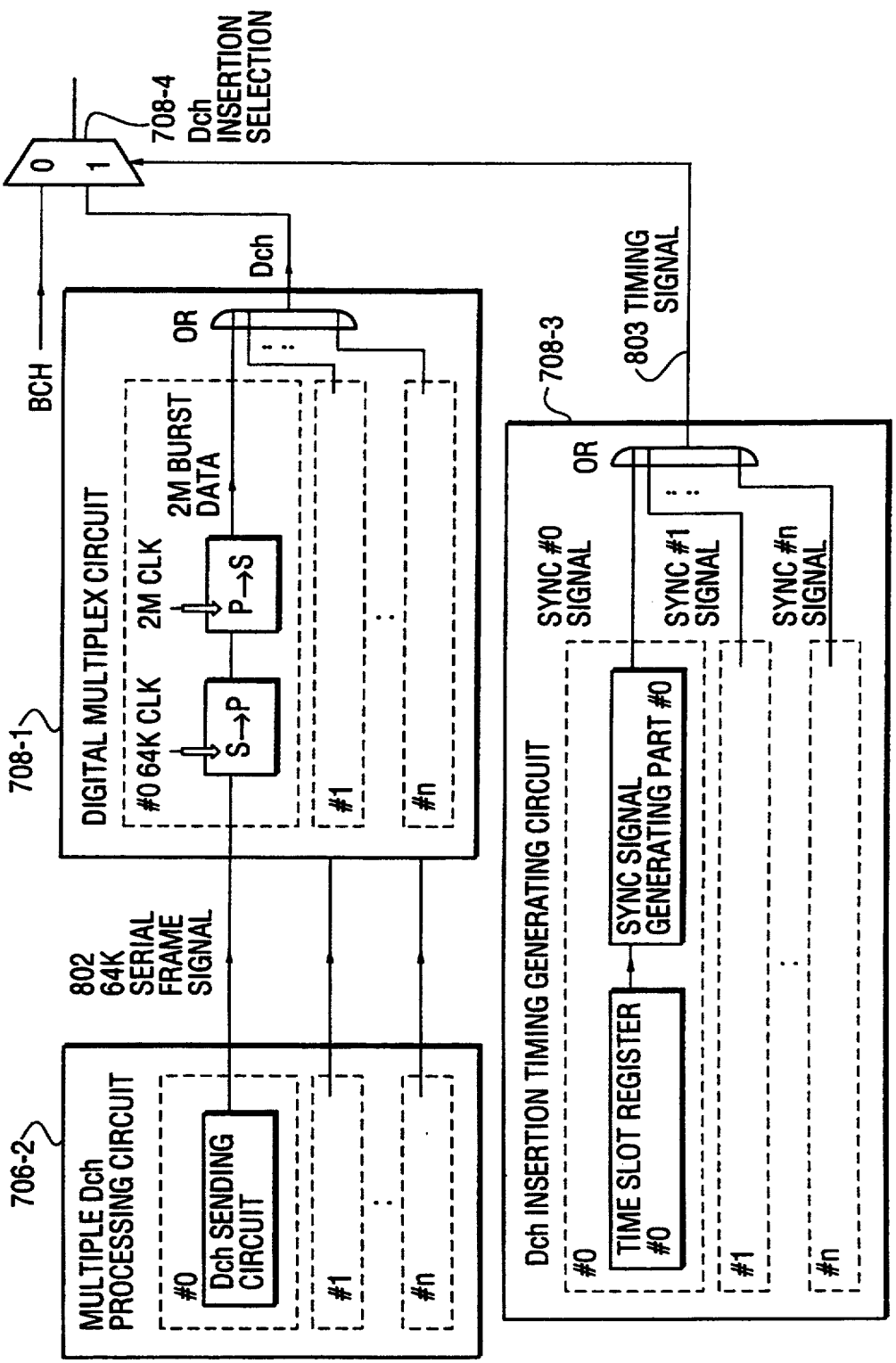
FIG. 9 is a more detailed configuration diagram centered around the sending function.

Next, FIG. 9 shows the configuration of FIG. 8 partially in detail.

As shown in FIG. 9, the multiple Dch processing circuit 706-2 comprises a Dch sending circuit of n circuits, and a serial frame signal 802 having a transmission speed 64 kbits/sec (Refer to FIG. 8.) is outputted from each Dch sending circuit.

The serial frame signal 802 of these n kinds is each converted to a parallel signal in an n circuit serial-parallel (S-P) conversion circuit that acts by a clock (CLK) of 64 kbits/sec. Then, the parallel signal of these n kinds is each converted to a burst frame signal of n kinds having a transmission speed 2 Mbits/sec in an n circuit parallel-serial (P-S) conversion circuit that acts by a clock of 2 Mbits/sec. These signals respectively store data only at any time slot position. The D channel signal Dch in the SIG2 format of FIG. 8 by an "OR" adding of the burst frame signal of n kinds.

Meanwhile, the Dch insertion timing generation circuit 708-3 comprises a register for setting an n circuit time slot. In a SYNC signal generating part of the n circuits, a SYNC signal is generated at a time slot position set in each above register. The timing signal 803 is generated by an "OR" adding of the SYNC signal of these n kinds.

Figure 1:
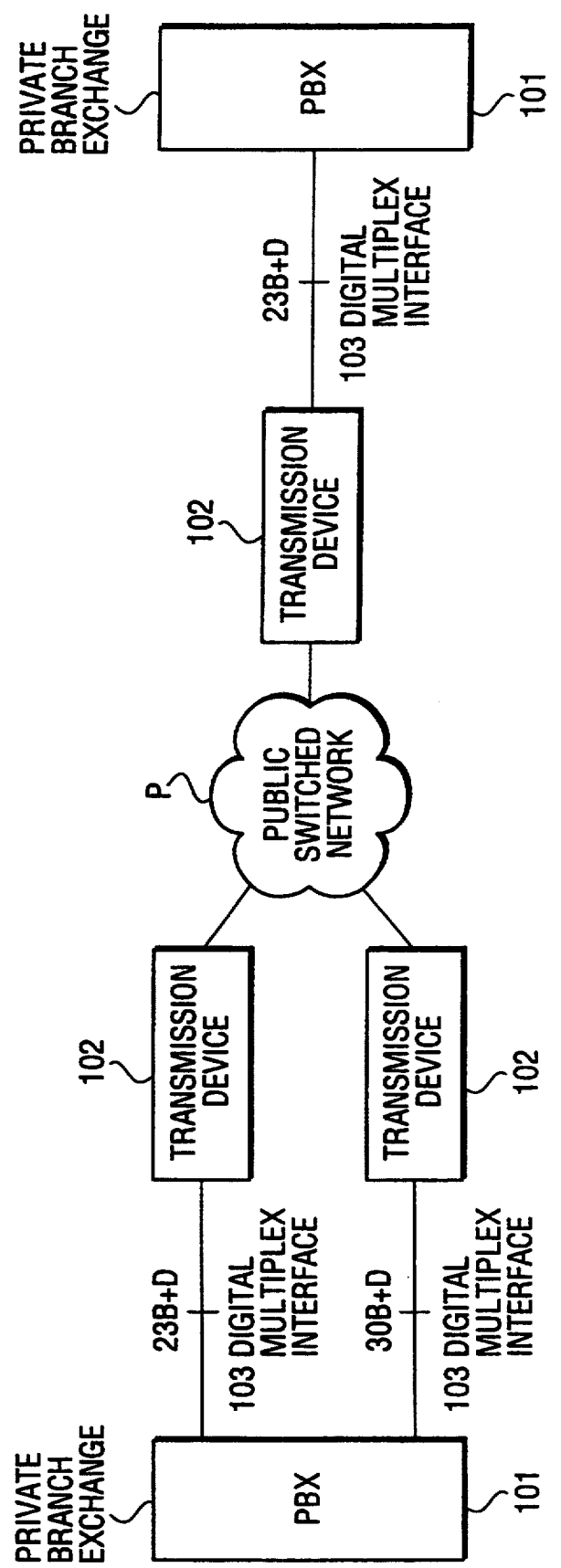
FIG. 1 is a configuration diagram of a commonly used digital signal network.
Figure 2A:
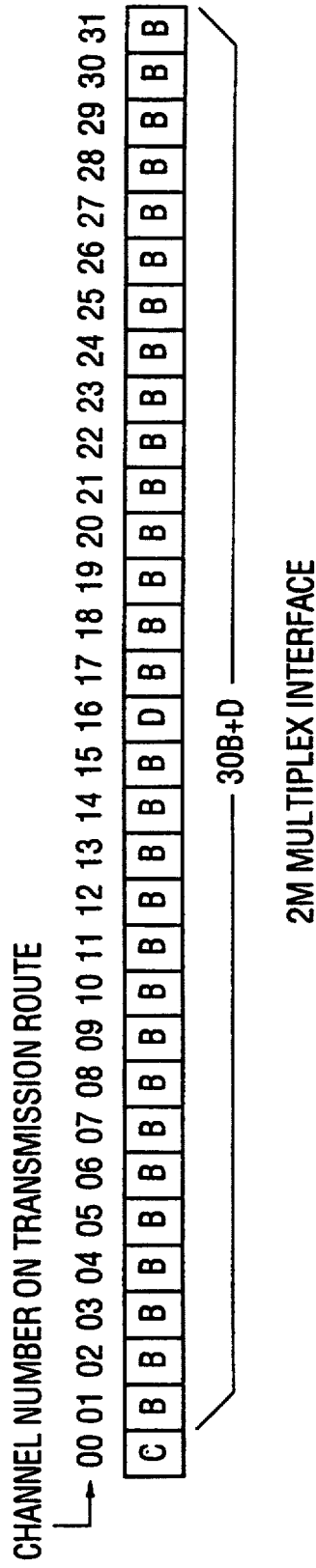
FIG. 2A and FIG. 2B show examples of commonly used channel assignments on the transmission route.
Figure 2B:
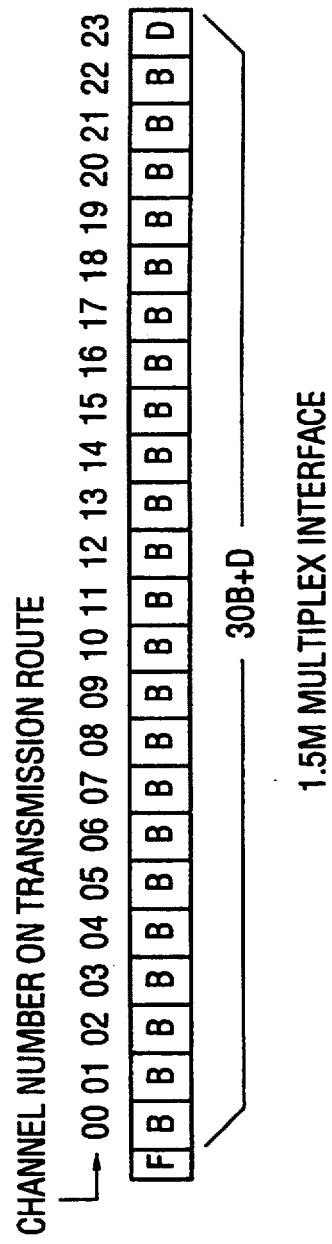
Figure 3:
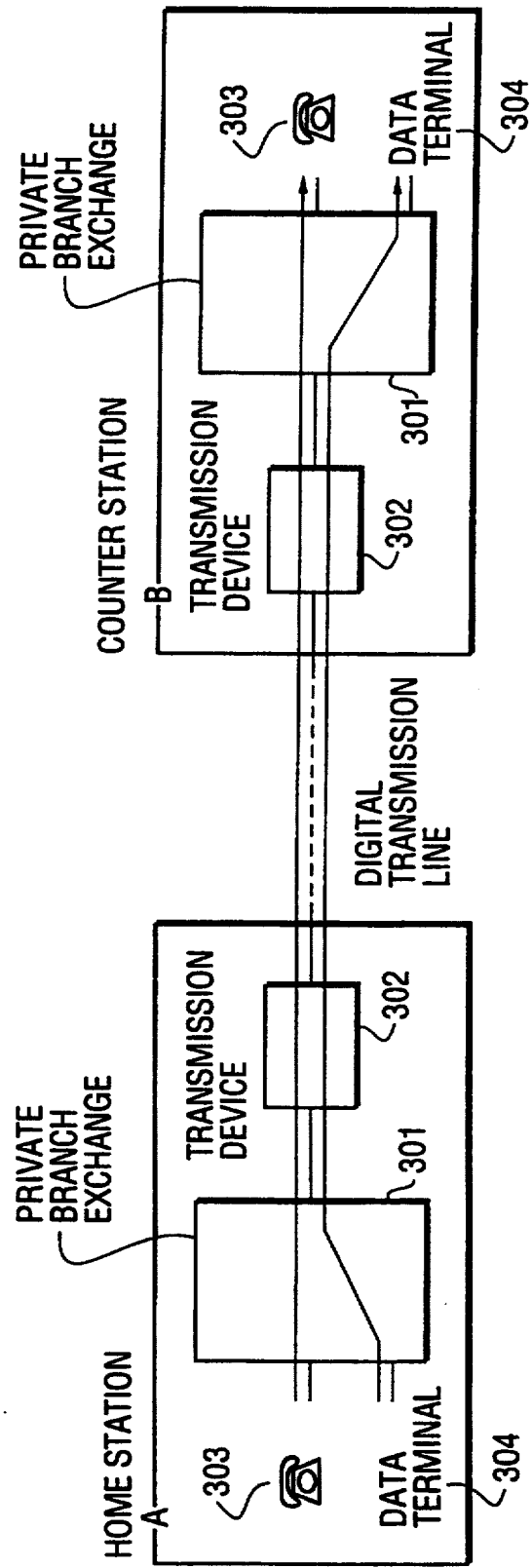
FIG. 3 shows a commonly used method of testing sending and receiving a signal.
Figure 10:
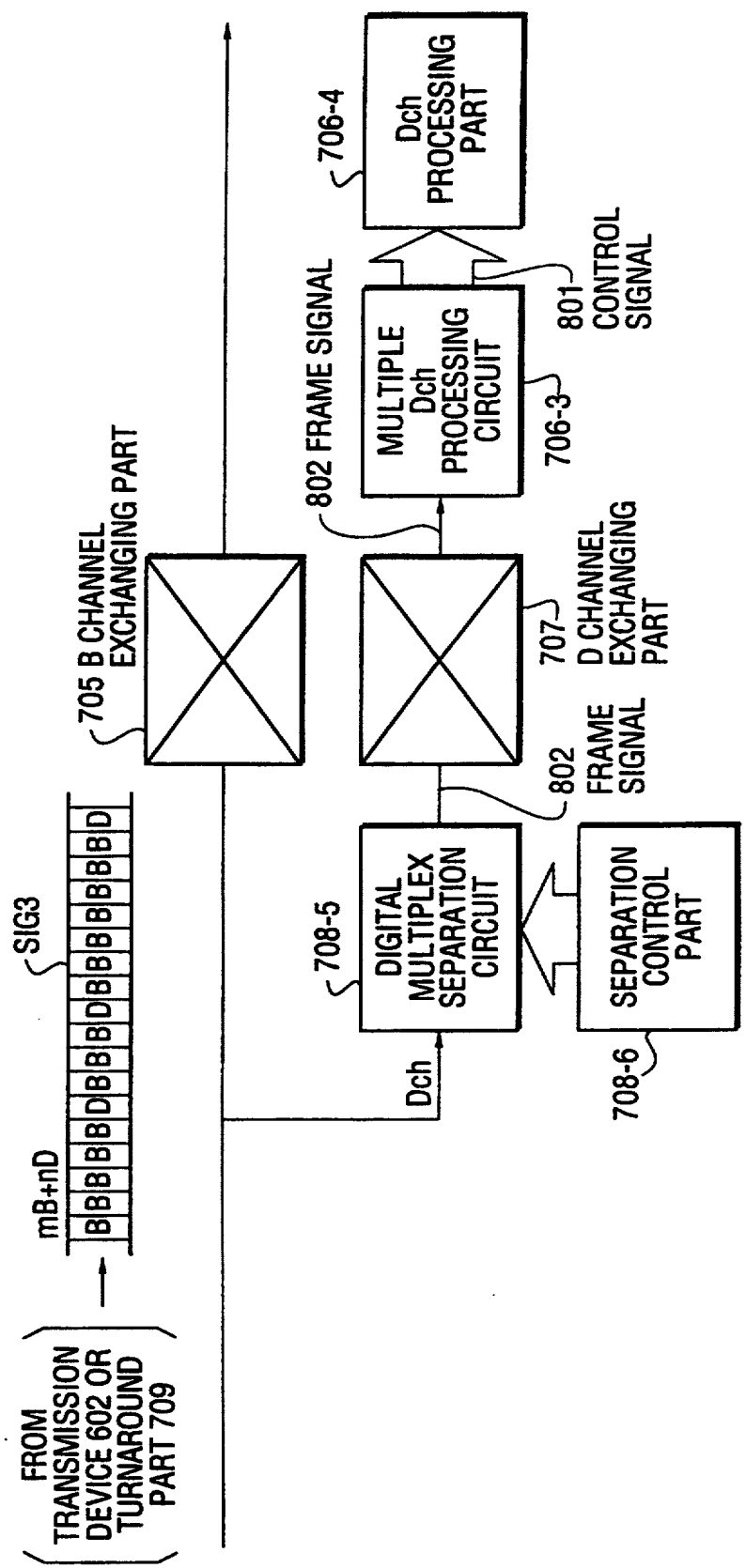
FIG. 10 is a PBX configuration diagram centered around a receiving function.

Next, FIG. 10 is a block diagram of the receiving side that separates the D channel signal Dch from the digital multiplex interface 603 (FIG. 1) at the PBX 601. In FIG. 10, the digital multiplex circuit 708-5 and separation control part 708-6 are configured in the transmission route terminating part 708 of FIG. 7, and the multiple Dch processing circuit 706-3 and the Dch processing part 706-4 are configured in the multiple D channel terminating part 706 of FIG. 7.

In FIG. 10, among the multiplexation signals inputted in an mB+nD format shown as SIG3 from the transmission device 602 of FIG. 6 through the digital multiplex interface 603, the B channel signal Bch is transmitted "as is" to the data terminal 702 or the telephone device 701 of FIG. 7 from the PBX 601. At a testing time of sending and receiving a signal explained later, the multiplexation signal described above is inputted from the turnaround part 709 (FIG. 7). Although at this time, the B channel signal Bch passes through the B channel exchanging part 705 of FIG. 10, at a receiving time during an ordinary time of sending and receiving a signal the B channel exchanging part 705 does not exchange the time slot. This action is later described together with the action of a receiving time in a test of sending and receiving a signal.

Meanwhile, among the above multiplexation signals, the D channel signal Dch is separated from the B channel signal Bch in the digital multiplex separation circuit 708-5 that acts under the control of the separation control part 708-6, and is extracted as the frame signal 802. The separation control part 708-6 is realized as a software processing executed by a central processing device not particularly shown in the drawing.

This frame signal 802 becomes a frame signal 802' at the D channel sending and receiving part 707, and is inputted into the multiple Dch processing circuit 706-3 and is dissembled to the control signal 801 by an entirely reverse processing to the earlier described sending side multiple Dch processing circuit 706-2 (FIG. 8).

At a receiving time during an ordinary time of sending and receiving a signal, the D channel exchanging part 707 does not exchange the time slot. This action will be later described together with the action at a receiving time of the test of sending and receiving a signal.

This control signal 801 is processed by the Dch processing part 706-4 on the receiving side and performs a call-up control and the like. The Dch processing part 706-4 is realized as a software processing executed by a central processing device not particularly shown in the drawing.

Next, a channel worth of logical data configuration of the D channel Dch signal and the frame signal 802 in FIG. 7, FIG. 8 or FIG. 9 is explained.

First, as described earlier, the frame signal 802 performs sending and receiving of a signal based on the HDLC format which is a format of inserting a data part between a beginning flag F="01111110" and a terminating flag F="01111110" the same as the beginning flag, as shown in FIG. 11A, where "CK" is an error examination code. Besides, although not particularly shown in the drawing, address data and various control data are also added.

Second, the D channel signal Dch comprises a data configuration shown in FIG. 11B. This data configuration shows the format logically configured on the data part sent in the HDLC format of FIG. 11A, and the meaning of each comprising data is as shown in FIG. 11B.

Figure 11C:
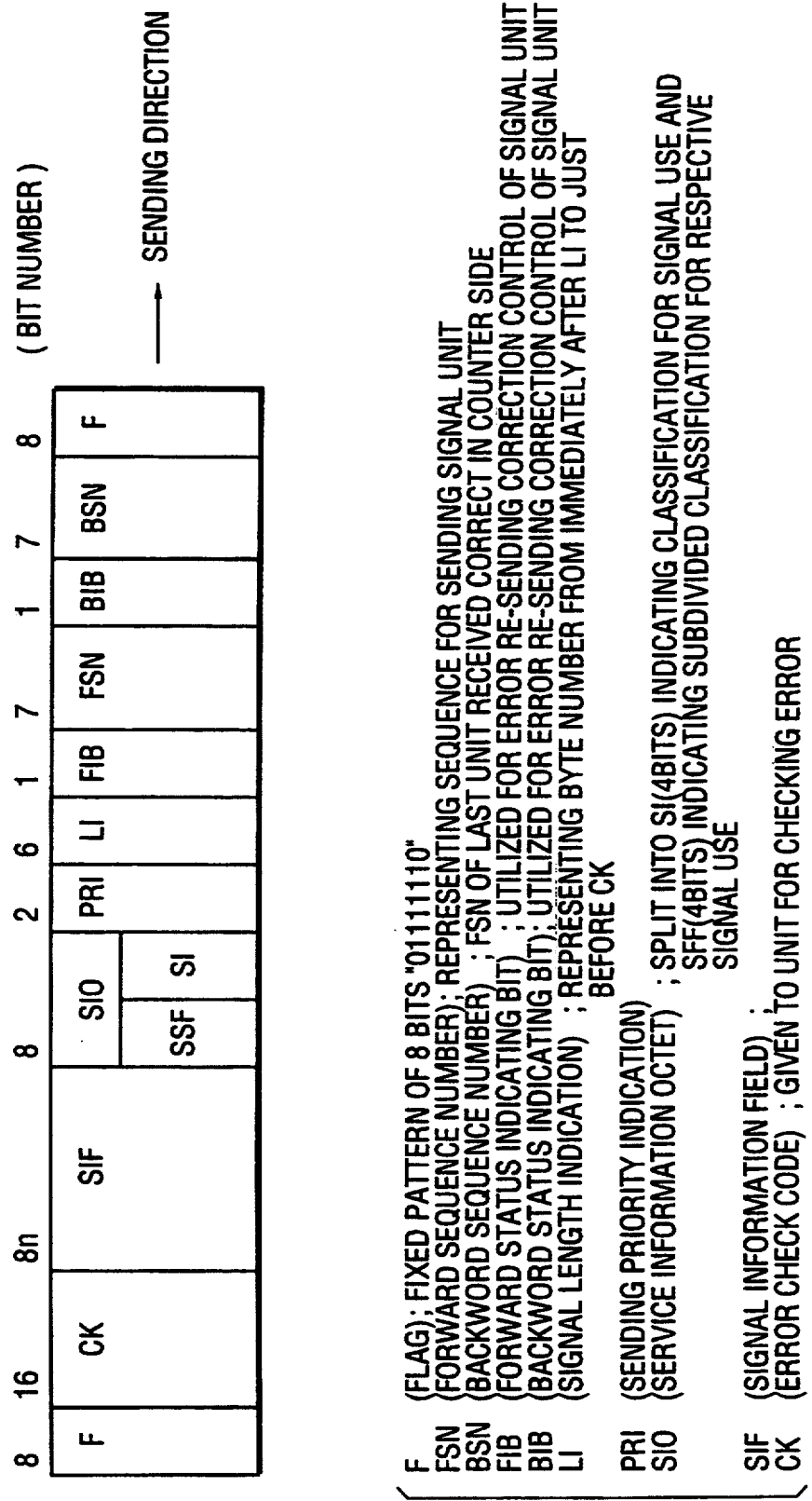
FIG. 11C is a configuration diagram of a No. 7 signal format.

Although in this embodiment, an explanation is made by having the D channel format represent the format of the control channel signal, this invention can adopt e.g. a No.7 signal format other than the D channel format. As a reference, No. 7 signal format is shown in FIG. 11C. Like the case of the D channel format, this data configuration is also a format configured logically on the data part sent in the HDLC format of FIG. 11A.

Both signal formats of FIGS. 11B and 11C are common in that they contain call-up information, disconnect information, and information of such as the telephone number of the addressee.

The action of the ordinary time of sending and receiving a signal in the preferred embodiment of the above configuration is explained below.

First, on the sending side of FIG. 8, the content of each control signal 801 sent to a counter station (or a plurality of a counter station) is set by the Dch processing part 706-1.

This control signal 801 is converted to a frame signal 802 of the HDLC format of FIG. 11A in the multiple Dch processing circuit 706-2.

This frame signal 802 is temporarily stored in the memory not particularly shown in the drawing within the digital multiplex circuit 708-1.

Meanwhile, from the Dch insertion timing generation circuit 708-3, under the control of the multiplexation control part 708-2, as shown in FIG. 8, the timing signal 803 that become active at the timing of the empty channel to which the B channel signal Bch to be inputted to the PBX 601 is not assigned is outputted.

Simultaneously, the frame signal 802 temporarily stored in the digital multiplex circuit 708-1 is read as the D channel signal Dch at the above active timing.

Furthermore, the selector for Dch insertion 708-4 selects the D channel signal Dch read out from the above digital multiplex circuit 708-1.

Then, the selector for Dch insertion 708-4 selects the B channel signal Bch at a timing other than the above active timing.

The above actions enables an output of the multiplexation signal mB+nD (SIG3 of FIG. 8) to which the B channel signal Bch and the D channel signal Dch are assigned in any proportion.

Figure 12A:
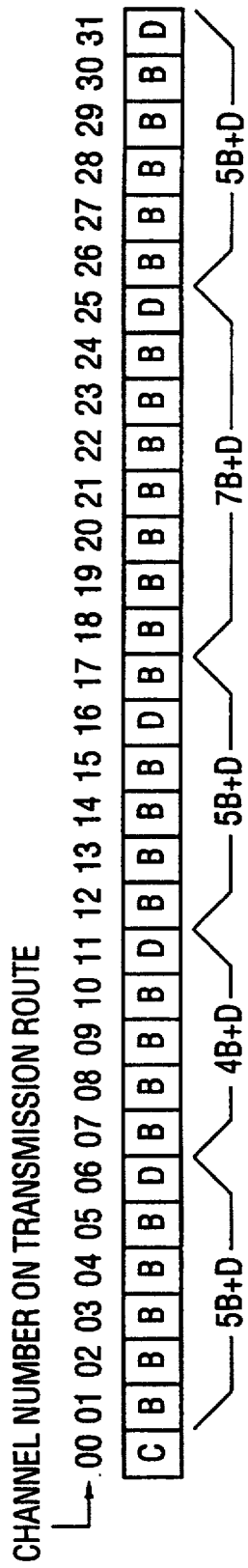
FIGS. 12A and 12B show examples of the channel assignment on the transmission route in the embodiment of this invention.
Figure 12B:
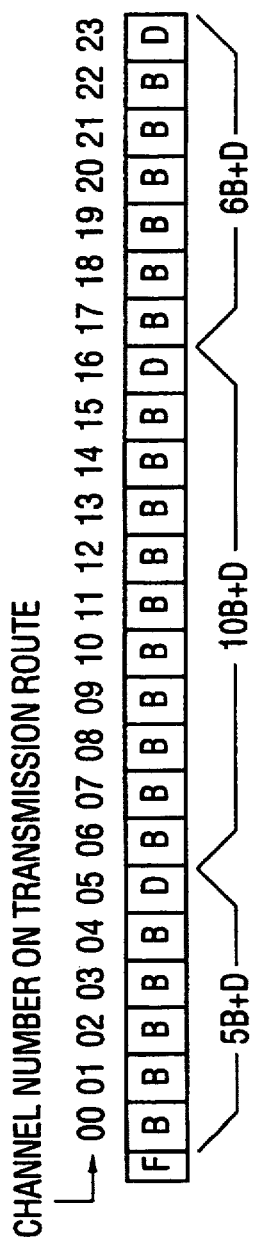

The concrete example of the above multiplexation signal mB+nD is considered. Now, for instance, when the transmission device 602-1 of FIG. 6 comprises a first route 604-1 through a fifth route 604-5 as shown in FIG. 6, and is terminated with a plurality of existing transmission route respectively comprising channel configurations of 5B+D, 4B+D, 5B+D, 7B+D and 5B+D, as the digital multiplex interface 603-1 between the PBX 601-1 and the transmission device 602-1, as shown in FIG. 12A, a 2M multiplex interface can be used, where the D channel signal Dch is multiplexed in the channel number 06, 11, 16, 25 and 31. Meanwhile, as the digital multiplex interface 603-2 between the PBX 601-2 and the digital multiplex interface 603-2 shown in FIG. 6, as shown in FIG. 12B, a 1.5M multiplex interface can be used, where the D channel signal Dch is multiplexed in the channel number 05, 16 and 23.

Above each setting can be set freely by the multiplexation control part 708-2 of the respective PBX 601 of FIG. 6.

Next, the receiving side of FIG. 10 performs an entirely reverse action as the sending side of FIG. 8.

That is, although not particularly shown in the drawing, the digital multiplex separation circuit 708-5 generates a similar timing signal as the timing signal 803 of FIG. 8 in the separation control part 708-6. Thus, based on an entirely reverse action of the action in the digital multiplex circuit 708-1 of FIG. 8, the D channel signal Dch inputted through the digital multiplex interface 603 is temporarily taken in a memory not particularly shown in the drawing within the digital multiplex separation circuit 708-5.

The D channel signal Dch is inputted to the multiple Dch processing circuit 706-3 in a format of the frame signal 802, where the control signal 801 is taken out.

With above actions, the D channel signal Dch can be taken out from the multiplexation signal of any format mB+nD inputted from the digital multiplex interface 603.

Explanation of a Testing Time of Sending and Receiving a Signal.

Next, actions at a testing time of sending and receiving a signal is explained.

In the following explanation, a case of self-testing of sending and receiving a signal in one PBX 601 of FIG. 6 is shown. In the self-testing of sending and receiving a signal of this invention, by testing whether a call-up from one data terminal 702 or one telephone device 701 of FIG. 7 is received normally by another data terminal 702 or another telephone device 701, sending and receiving a signal by the PBX 601 can be tested.

At the testing time of sending and receiving a signal, the PBX 601 is equipped with the turnaround part 709 of FIG. 7, instead of the digital multiplex interface 603. Thus, the output of the transmission route control part 708 within the PBX 601 is turned around "as is" to its input.

Following is a sequential explanation of the action of a test of sending and receiving a signal. The systematic flow of each processing is executed according to the action flow chart of FIG. 14, and the action explanation diagram is referred to, as necessary.

First, each kind of data within the PBX 601 for a call-up control is initialized. (STEP1 of FIG. 14)

Next, in FIG. 8, the content of each control signal 801 sent to a counter station (or plural counter stations) is set at the Dch processing part 20. Each control signal 801 contains data for setting the D channel to the terminal side mode.

In the multiplexation control part 708-2 and the Dch processing part 706-1 of FIG. 8, among the 30 channel time slots the PBX 12 processes, for instance, the fifteen channels of the first half is set as an A group and the D channel mode corresponding to the A group is set as the network side mode, and the channel setting is set to 14B+1D. Further, the latter 15 channels is set as a B group and the D channel mode corresponding to the B group is set as the terminal side mode, and the channel mode is set to 14B+1D. And the setting is performed of such as the correspondence between each D channel and the network of FIG. 6 or to the terminal. These setting actions are performed in a form of a data download to each part of FIG. 8 from the database on the disk memory device and the like not particularly shown in the drawing within the PBX 601 (STEP2 of FIG. 14).

Figure 14:
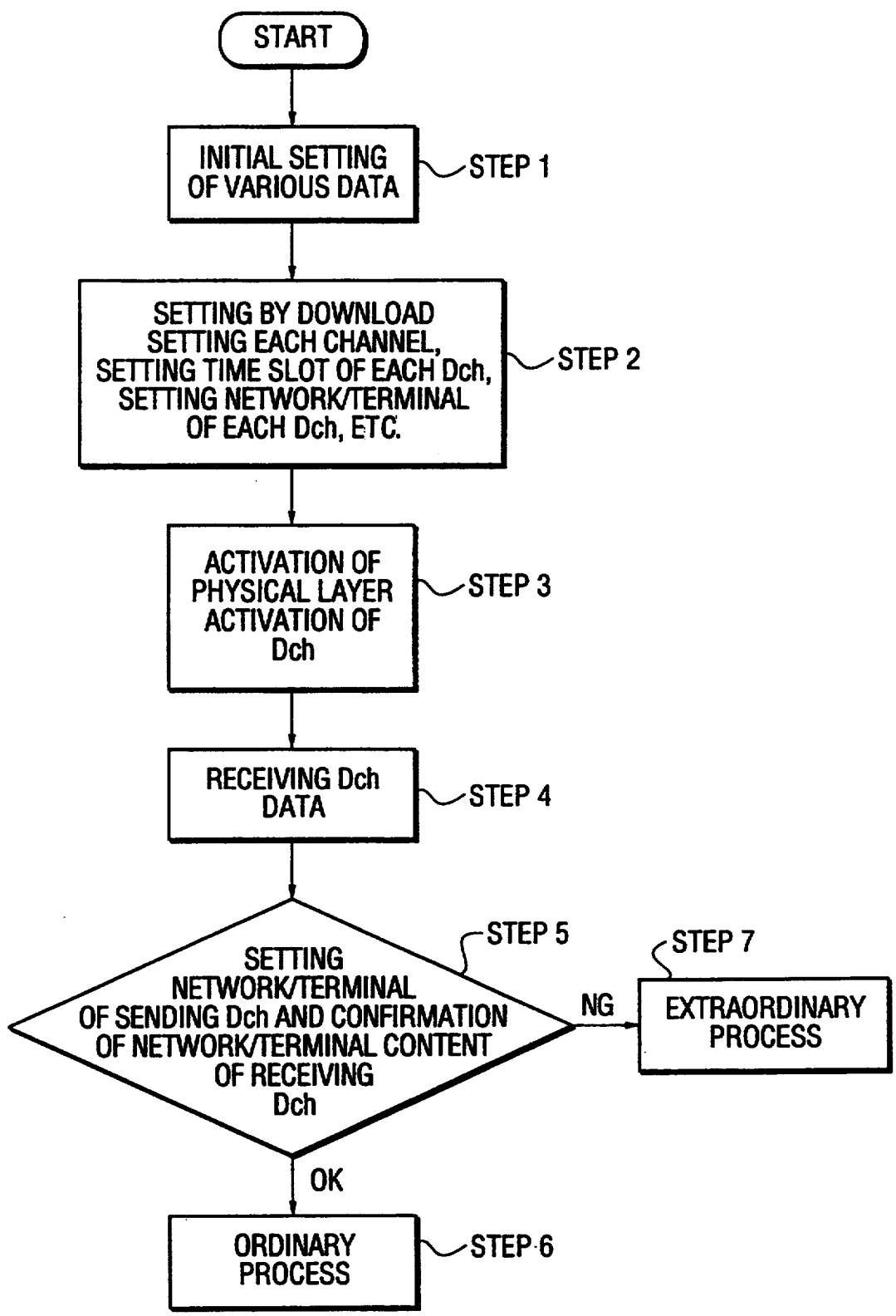
FIG. 14 is an operational flow chart of testing of sending and receiving a signal.

After above setting actions, a physical layer is activated and the D channel sending (outputting) processing is activated (STEP3 of FIG. 14). The following is an explanation of the sending processing.

First, the user information from the data terminal 702 or the telephone device 701 accommodated in the PBX 601 of FIG. 7 is inputted as the B channel signal Bch through the communication route switch 703 to the B channel exchanging part 705. The time slot configuration of this B channel signal Bch is, for instance, as shown as SIG1a of FIG. 13. In this case, the channel to be made to the D channel is left as an empty channel. The B channel exchanging part 705 does not perform a switching action of the B channel signal Bch at a time of sending a signal. Consequently, the time slot configuration of the B channel signal Bch outputted here and sent to the transmission route terminating part 708 is e.g. like as shown in SIG1c of FIG. 13 and equal to SIG1a.

Figure 13:
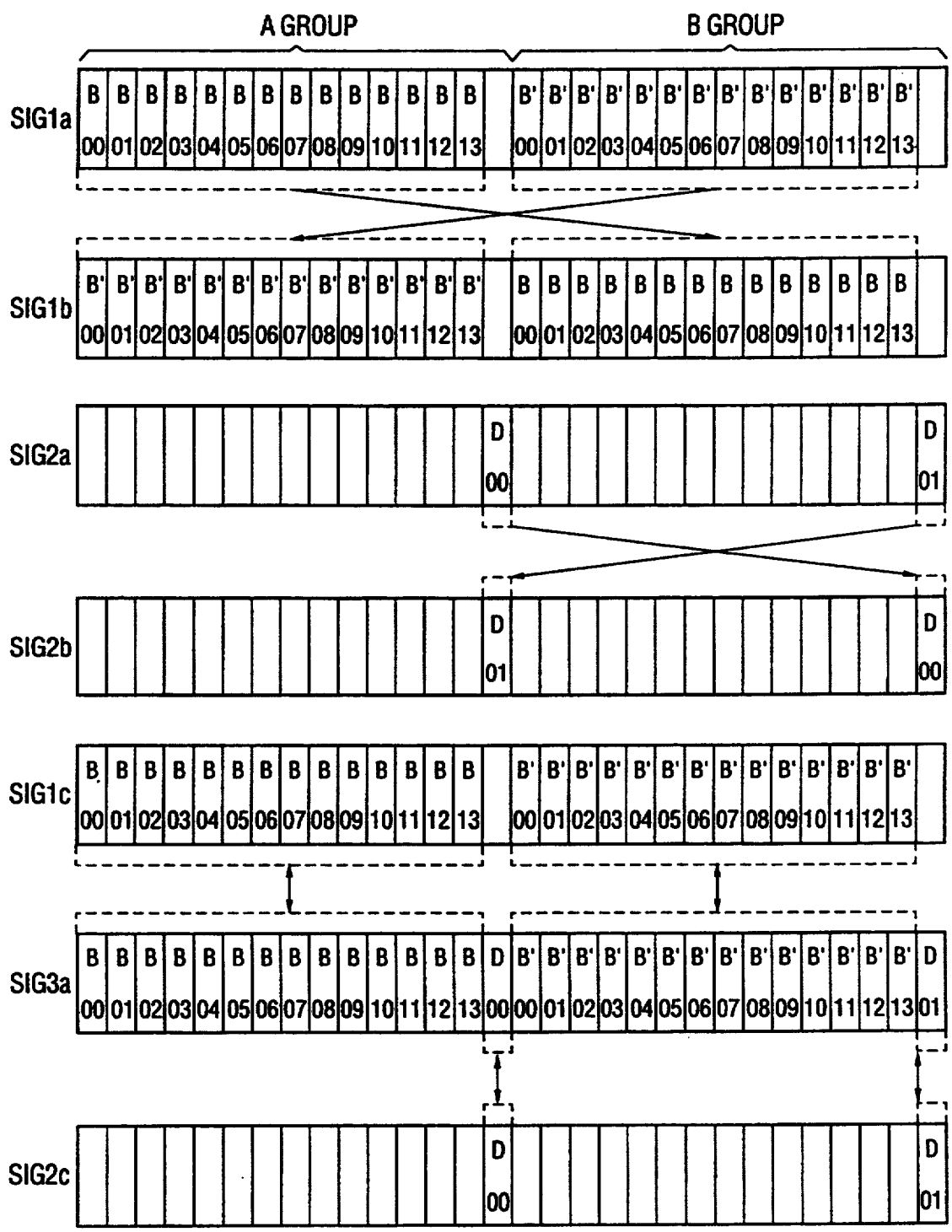
FIG. 13 shows an operation example of testing of sending and receiving a signal.

Meanwhile, the control signal 801 outputted from the Dch processing part 706-1 of FIG. 8 has a content of setting each D channel that corresponds to the A group and the B group of the earlier described time slot configuration to the network side mode and the terminal side mode. The time slot configuration corresponding to the frame signal 802 (Refer to FIG. 8) outputted from the multiple D channel terminating part 706 of FIG. 7 in response to this signal is e.g. as shown as SIG2a of FIG. 13. In FIG. 13, SIG2a through SIG2c are shown as the images of the supposed case that they are finally outputted from the digital multiplex circuit 708-1 of FIG. 8. In the time slot configuration shown as the above SIG2a, the D channel with a channel number "00" is set in the network side mode, and the D channel with a channel number "01" is set in the terminal side mode. The above frame signal 802 is inputted to the D channel exchanging part 707 that does not perform an exchanging action of the frame signal 802 at a sending action time. Consequently, the time slot configuration corresponding to the frame signal 708 outputted here and sent to the transmission route terminating part 708 (FIG. 7) is e.g. like as shown as SIG2c of FIG. 13 and is equal to SIG2a.

The transmission route terminating part 708 multiplexes the D channel signal Dch corresponding to the SIG2c and SIG1c which are the B channel signal Bch of FIG. 13, and sends out the signal based on the 2M multiplex interface shown as SIG3a of FIG. 13.

The signal thus sent is turned around "as is" by the turnaround part 709 and inputted to the transmission route terminating part 708.

Thereafter, the PBX 12 of FIG. 7 shifts to the processing of receiving Dch data (STEP4 of FIG.14).

First, the digital multiplex separation circuit 708-5 within the transmission route terminating part 708 separates the B channel signal Bch and the D channel signal Dch and send out the B channel signal Bch to the B channel exchanging part 705, and sends out the B channel signal Bch to the B channel exchanging part 705 and the D channel signal Dch as the frame signal 802 (Refer to FIG. 10.) to the D channel exchanging part 707. At this time, the time slot configuration is respectively equal to SIG1c (SIG1a) of FIG. 13 and SIG2c (SIG2a) of FIG. 13.

The B channel exchanging part 705 performs an exchanging action of the B channel signal Bch at a receiving action time. Namely, the B channel exchanging part 705 exchanges the time slots each other between a plurality of the B channel corresponding to the D channel signal set to the network side mode and a plurality of the B channel corresponding to the D channel signal set to the terminal side mode. Therefore, the time slot configuration of the B channel signal Bch outputted here and sent to the communication route switch 703 (FIG. 7) is e.g. like as shown as SIG1b of FIG. 13, and their time slots are exchanged between the B channels (B00 through B13) of the A group and the B channels (B'00 through B'13) of the B group. Namely, (B'00 through B'13) are made the B channels of the A group in this order and (B00 through B13) are made the B channels of the B group in this order.

Meanwhile, the D channel exchange part 707 performs an exchanging action of the frame signal 802 at a receiving action time. That is, that the D channel exchange part 707 exchanges their time slots with each other between the D channel set to the network side mode and the D channel set to the terminal side mode. Consequently, the time slot configuration corresponding to the fame signal 802' outputted here and sent to the multiple D channel terminating part 706 (FIG. 7) is as shown e.g. like SIG2b of FIG. 13. The D channel (D00) of the A group and the D channel (D01) of the B group exchanging their time slots with each other. Namely, the (D01) of the terminal side mode is made the D channel of the A group and the (D00) of the network side mode is made the D channel of the B group.

After the above exchanging actions, the frame signal 802' is inputted from the multiple Dch processing circuit 706-3 to the Dch processing part 706-4 (FIG. 10) on the receiving side. Then, the D channel set to the network side mode is connected with the D channel receiving part of the terminal side mode within the Dch processing part 706-4, and the D channel set to the terminal side mode is connected with the D channel receiving part of the network side mode within the Dch processing part 706-4. Each of these receiving parts is realized as a software processing.

Based on the above connecting actions, each receiving part is judged whether or not the setting regarding the network and the terminal of the D channel sent and the network and the terminal of the D channel received correctly correspond to each other (STEP5 of FIG. 14). According to the judging result, the processing of the PBX 601 shifts to an ordinary call-up processing (STEP6 of FIG. 14) or an error processing (STEP 7 of FIG. 14).

For instance, sending of a signal using (B02) channel of the A group which is the network side mode is an station receiving of a incoming call to the (B'02) channel for the B group of the terminal side mode. And the sending of a call using the (B'03) channel of the B group is an station sending of a signal to the (B03) channel. Thus, for instance, the test of sending and receiving a signal from a telephone device 701-1 to another telephone device 701-2 or that from a data terminal 702-1 to another data terminal 702-2 becomes possible.

What is claimed is:

1. A testing device for sending and receiving a signal having two slots including a plurality of control channel signals, the signal being used in a control channel terminating interface having a control channel signal multiplexer and a control channel signal demultiplexer, comprising:

means for setting a mode of a plurality of control channel signals multiplexed by the control channel signal multiplexer, to either a first mode or a second mode;

means for receiving the signal from said control channel signal multiplexer and for inputting the signal from said control channel signal multiplexer to the control channel signal demultiplexer;

means for exchanging respective time slots between the control channel signal set at said first mode and the control channel signal set at said second mode in the control channel signal demultiplexer; and means for testing a sending and receiving of the signal by receiving a control channel signal via said means for receiving.

2. The testing device for sending and receiving a signal of the control channel terminating device according to claim 1, wherein said first mode is on the terminal side mode and said second mode is on the network side mode.

3. A testing device for sending and receiving a signal having time slots including a plurality of control channel signals, the signal being used in a control channel terminating interface for terminating control channel signals on a digital multiplex transmission route, said testing device comprising:

means for multiplexing and separating control channel signal selectively to and from, respectively, a time slot in the signal on the digital multiplex transmission route;

means for setting a mode of the control channel signals multiplexed by said transmission route terminating means to either a first mode or a second mode;

means for receiving the signal from said means for multiplexing and separating and reinputting the signal to said means for multiplexing and separating;

means for exchanging time slots between one of the control channel signals set in said first mode and another one of the control channel signals set in said second mode in each of said plurality of control channel signals separated by said means for multiplexing and separating; and means for testing a sending and receiving of the signal via said means for receiving.

4. An apparatus receiving first and second clock signals and a B channel signal, comprising:

a multiple D channel processing circuit including n D channel sending circuits outputting respective serial frame signals;

a digital multiplex circuit including n serial-parallel conversion circuits coupled to corresponding ones of the n D channel sending circuits, to convert the respective serial frame signals into respective parallel signals using the first clock signal, n parallel-serial conversion circuits coupled to corresponding ones of the n serial-parallel conversion circuits, to convert the respective parallel signals into respective burst signals, and a first OR circuit coupled to the n parallel-serial conversion circuits, to perform an OR operation on the respective burst signals to output a D channel signal;

a D channel insertion timing generation circuit having n circuits including n time slot registers storing respective data indicating a respective time slot of a multiplexed signal, n sync signal generating parts coupled to corresponding ones of the n time slot registers, to generate respective sync signals based on the respective data, and a second OR circuit coupled to the n sync signal generating parts, to perform an OR operation on the respective sync signals to generate a timing signal; and a selector coupled to the digital multiplex circuit, the D channel insertion timing generating circuit and to receive the B channel signal, for selecting between the B channel signal and the D channel signal based on the timing signal, to generate the multiplexed signal having m B channels and n D channels, m and n being integers.

5. An apparatus as claimed in claim 4, wherein the apparatus is included in a private branch exchange, further comprising:

a B channel exchanging part coupled to the selector;

a D channel exchanging part coupled between said multiple D channel processing circuit and said digital multiplex circuit; and a turnaround part coupled to said selector, to receive the multiplexed signal, said B channel exchanging part, said D channel exchanging part and said turnaround part being activated to perform testing of the private branch exchange.

6. An apparatus as claimed in claim 4, wherein the B channel signal is generated by a communication route switch in a private branch exchange.

7. An apparatus as claimed in claim 4, wherein the first clock signal has a frequency of about 64 kilohertz, and wherein the second clock signal has a frequency of a about 2 megahertz.

8. A transmission system, connected to a multiplexed signal line and a plurality of private lines formed of signaling channels and information channels, each of the private lines having at least one of the signaling channels and a plurality of the information channels, said transmission system comprising:

receiving means for receiving pieces of information data and a plurality of control signals from the multiplexed signal line;

control means for identifying one of the information channels of one of the private lines for each piece of the information data, and identifying one of the signaling channels of one of the private lines for each of the control signals; and transmitting means for transmitting each of the pieces of information data and each of the control signals on the information and signaling channels, respectively, identified by said control means.

9. A transmission system, connected to a multiplexed signal line, including multiplexed information and signaling channels, and to a plurality of private lines formed of signaling channels and information channels, each of the private lines having at least one of the signaling channels and a plurality of the information channels, said transmission system comprising:

receiving means for receiving on the private lines pieces of information data on the information channels and control signals on the signaling channels;

control channel processing means for locating an empty time slot on the multiplexed signal line for each of the signaling channels of each of the private lines and for indicating the empty time slot as an available signaling channel of the multiplexed signal line;

control means for indicating one of the multiplexed signaling channels of the multiplexed line indicated to be available by said control channel processing means as corresponding to one of the control signals of one of the private lines, and indicating one of the multiplexed information channels of the multiplexed line as corresponding to one of the pieces of the information data received by said receiving means; and transmitting means for multiplexing each of the pieces of information data and each of the control signals on the multiplexed information and signaling channels of the multiplexed signal line indicated by said control means.

10. A transmission system, connected to a multiplexed signal line, including multiplexed information and signaling channels, and to a plurality of private lines formed of signaling channels and information channels, each of the private lines having at least one of the signaling channels and a plurality of the information channels, said transmission system comprising:

private line receiving means for receiving on the private lines pieces of information data on the information channels and control signals on the signaling channels;

control channel processing means for locating an empty time slot on the multiplexed signal line for each of the signaling channels of each of the private lines and for indicating the empty time slot as an available signaling channel of the multiplexed signal line;

multiplexed line control means for indicating one of the multiplexed signaling channels of the multiplexed line indicated to be available by said control channel processing means as corresponding to one of the control signals of one of the private lines, and indicating one of the multiplexed information channels of the multiplexed line as corresponding to one of the pieces of the information data received by said private line receiving means;

multiplexed line transmitting means for multiplexing each of the pieces of information data and each of the control signals on the multiplexed information and signaling channels of the multiplexed signal line indicated by said multiplexed line control means;

multiplexed line receiving means for receiving pieces of information data and a plurality of control signals from the multiplexed signal line;

private line control means for identifying one of the information channels of one of the private lines for each piece of the information data, and identifying one of the signaling channels of one of the private lines for each of the control signals; and private line transmitting means for transmitting each of the pieces of information data and each of the control signals on the information and signaling channels, respectively, identified by said private line control means.

11. The transmission system according to claim 10, wherein a digital multiplex transmission route carries the multiplexed signaling channels the digital multiplex transmission route configurating an Integrated Services Digital Network.

* * * * *

UNITED STATES PATENT AND TRADEMARK OFFICE
CERTIFICATE OF CORRECTION

PATENT NO. : 5,430,708
DATED : July 4, 1995
INVENTOR(S) : Fukuda et al

It is certified that error appears in the above-indentified patent and that said Letters Patent is hereby corrected as shown below:

Title Page, item [56] Foreign Pat. Doc., insert --A-- after "2158326"

Col. 17, line 41, delete "a"

Col. 18, line 65, insert --,-- after "channels"

Col. 18, line 66, delete "configurating" and insert --configuring--.

Signed and Sealed this

Twelfth Day of December, 1995

Attest:

BRUCE LEHMAN

Attesting Officer

Commissioner of Patents and Trademarks